(12) United States Patent
Diehl et al.

(10) Patent No.: US 7,053,578 B2
(45) Date of Patent: May 30, 2006

(54) FLOOR TREATMENT SYSTEM

(75) Inventors: Ralph Diehl, Baltmannsweiler (DE); Joachim Keppler, Winnenden (DE); Roger Skoumal, Korb (DE); Gottfried Benzler, Kirchberg (DE)

(73) Assignee: Alfred Kaercher GmbH & Co. KG, Winnenden (DE)

( * ) Notice: Subject to any disclaimer, the term of this patent is extended or adjusted under 35 U.S.C. 154(b) by 0 days.

(21) Appl. No.: 11/030,013

(22) Filed: Jan. 4, 2005

(65) Prior Publication Data

US 2005/0150074 A1 Jul. 14, 2005

Related U.S. Application Data

(63) Continuation of application No. PCT/EP03/06225, filed on Jun. 13, 2003.

(30) Foreign Application Priority Data

Jul. 8, 2002 (DE) ................ 102 31 391

(51) Int. Cl.
*B25J 9/22* (2006.01)
*G05B 15/00* (2006.01)

(52) U.S. Cl. .............. 318/568.12; 318/568.13; 318/587; 15/319; 180/167; 700/258; 700/259; 446/175

(58) Field of Classification Search ........... 318/568.12, 318/568.13, 587; 15/319; 180/167; 700/258, 700/259; 446/175
See application file for complete search history.

(56) References Cited

U.S. PATENT DOCUMENTS 4,679,152 A * 7/1987 Perdue ................ 701/23
5,642,299 A * 6/1997 Hardin et al. ............. 702/142
5,787,545 A * 8/1998 Colens ................. 15/319
5,935,179 A * 8/1999 Kleiner et al. ............ 701/23

(Continued)

FOREIGN PATENT DOCUMENTS

EP  0 307 381  3/1989

(Continued)

OTHER PUBLICATIONS

*Patent Abstracts of Japan*, "Moving Type Device for Automatic Monitoring and Checking Work", vol. 008, No. 089, Publication No. 59005315, Jan. 12, 1984.

*Primary Examiner*—Paul Ip
(74) *Attorney, Agent, or Firm*—Lipsitz & McAllister, LLC

(57) ABSTRACT

The invention relates to a floor treatment system with a self-propelled and self-steering floor treatment unit, which comprises an electrically driven floor treatment assembly and also a rechargeable power supply unit and an electrical control system, and with a central charging station for recharging the power supply unit, the charging station having a transmitting device for emitting an infrared target radiation, and it being possible for the target radiation to be sensed in a directionally dependent manner by a receiving device of the floor treatment unit for the automatic alignment and positioning of the floor treatment unit at the charging station. In order to develop the floor treatment system in such a way that the floor treatment unit can reliably steer toward the central charging station, it is proposed according to the invention that the transmitting device has a first transmitting unit for the formation of a far field of the target radiation and a second transmitting unit for the formation of a near field of the target radiation, the near field extending over a wider and shorter area from the charging station than the far field.

17 Claims, 5 Drawing Sheets

U.S. PATENT DOCUMENTS

| | | | |
|---|---|---|---|
| 5,995,884 A * | 11/1999 | Allen et al. | 701/24 |
| 6,389,329 B1 | 5/2002 | Colens | |
| 6,415,203 B1 * | 7/2002 | Inoue et al. | 700/245 |
| 6,532,404 B1 * | 3/2003 | Colens | 700/262 |
| 6,711,280 B1 * | 3/2004 | Stafsudd et al. | 382/106 |
| 6,748,297 B1 * | 6/2004 | Song et al. | 700/259 |
| 6,764,373 B1 * | 7/2004 | Osawa et al. | 446/175 |
| 6,914,403 B1 * | 7/2005 | Tsurumi | 318/568.12 |
| 6,957,712 B1 * | 10/2005 | Song et al. | 180/167 |
| 6,965,211 B1 * | 11/2005 | Tsurumi | 318/568.13 |
| 6,975,246 B1 * | 12/2005 | Trudeau | 340/903 |
| 2002/0120364 A1 | 8/2002 | Colens | |
| 2002/0153185 A1 * | 10/2002 | Song et al. | 180/167 |
| 2003/0094922 A1 * | 5/2003 | Petersson et al. | 320/109 |
| 2004/0083570 A1 * | 5/2004 | Song et al. | 15/319 |
| 2004/0088081 A1 * | 5/2004 | Song et al. | 700/259 |
| 2004/0158357 A1 * | 8/2004 | Lee et al. | 700/258 |

FOREIGN PATENT DOCUMENTS

| | | |
|---|---|---|
| EP | 1 172 719 | 1/2002 |
| JP | 2003285288 A * | 10/2003 |
| WO | 99/28800 | 6/1999 |

* cited by examiner

FLOOR TREATMENT SYSTEM

This application is a continuation of international application number PCT/EP 03/06225 filed on Jun. 13, 2003.

The present disclosure relates to the subject matter disclosed in international application number PCT/EP 03/06225 of Jun. 13, 2003 and German application number 102 31 391.1 of Jul. 8, 2002, which are incorporated herein by reference in their entirety and for all purposes.

BACKGROUND OF THE INVENTION

The invention relates to a floor treatment system with a self-propelled and self-steering floor treatment unit, which comprises an electrically driven floor treatment assembly and also a rechargeable power supply unit, and with a central charging station for recharging the power supply unit, the charging station having a transmitting device for emitting an infrared target radiation, and it being possible for the target radiation to be sensed in a directionally dependent manner by a receiving device of the floor treatment unit for the automatic alignment and positioning of the floor treatment unit at the charging station.

By means of such floor treatment units, a floor surface can be treated, in particular cleaned, without it being necessary for an operator to move the floor treatment unit across the floor surface to be treated. Instead, the floor treatment unit is configured in such a way that it automatically travels across the floor surface to be treated in accordance with a predeterminable control program and thereby treats the floor surface by means of the floor treatment assembly. To supply it with power, the floor treatment unit has a rechargeable power supply unit, which is gradually discharged during the treatment of the floor surface. The charging state of the power supply unit is monitored by an electrical control system of the floor treatment unit, and if the charging state falls below a lower limit value, the floor treatment unit steers automatically toward the associated central charging station, which has a power source for recharging the power supply unit. Once recharging has taken place, the floor treatment unit can continue with the treatment of the floor surface.

In order to ensure that the mobile floor treatment unit finds the way to the central charging station and can steer toward it automatically and position itself with respect to it, an infrared target radiation is emitted by the transmitting device of the charging station. While it is traveling across the floor surface, the floor treatment unit comes into the area of the target radiation, which is sensed in a directionally dependent manner by a receiving device of the floor treatment unit, so that it can align itself on the basis of the target radiation received and steer toward the charging station. It has been found that the alignment and positioning of the floor treatment unit does not take place reliably in all cases.

EP 11 72 719 A1 discloses a floor treatment system with a self-propelled and self-steering floor treatment unit and a central charging station, it being possible for the central charging station to generate a first, widely distributed target radiation by means of a first transmitting unit and a second, focused target radiation by means of a second transmitting unit. The second target radiation extends only over a short region and serves for the alignment of the floor treatment unit with respect to the charging station, while the first target radiation reaches further and is widely distributed.

It is an object of the present invention to develop a floor treatment system of the type stated at the beginning in such a way that the floor treatment unit can reliably steer toward the central charging station even when it is relatively far away.

SUMMARY OF THE INVENTION

This object is achieved according to the invention in the case of a floor treatment system of the generic type by the transmitting device having a first transmitting unit for the formation of a far field of the target radiation and a second transmitting unit for the formation of a near field of the target radiation, the near field extending over a wider and shorter area from the charging station than the far field.

According to the invention, the radiation field of the target radiation is produced by forming a far field and a near field, two different transmitting units being used. The first transmitting unit serves here for producing a far field of the target radiation, i.e. the entire transmission energy of the first transmitting unit is provided for the far field. A near field of the target radiation, which extends over a shorter and wider spatial area than the far field, is produced by means of the second transmitting unit. The transmission energy provided by the second transmitting unit is therefore distributed over a wider area than the transmission energy for the far field provided by the first transmitting unit. It has been found that it can be ensured by such a configuration of the radiation field of the target radiation that the floor treatment unit can reliably steer toward the central charging station. While it is traveling across the floor surface to be treated, the floor treatment unit keeps coming into the area of the far field at time intervals, even when it is far away from the charging station, since the far field extends over a relatively narrow, but wide-ranging area in comparison with the near field. If the charging state of the power supply unit of the floor treatment unit falls below a lower limit value and the floor treatment unit in this state enters the area of the near field or far field, it then aligns itself in the direction of the central charging station and steers toward it. In this respect, the relatively wide near field facilitates the orientation of the floor treatment unit, while the wide-ranging far field permits an alignment of the floor treatment unit even when it is far away from the charging station.

A lobar configuration of the far field has proven to be particularly advantageous. In this respect, the far field has an axis of symmetry which is preferably aligned obliquely downward with respect to the horizontal. It may be provided, for example, that the axis of symmetry is inclined downward in relation to the horizontal at an angle of about 0.5° to approximately 2°, in particular at an angle of 1°. The aperture angle of the lobar far field with respect to its axis of symmetry in an advantageous configuration is about 3° to about 8°, in particular approximately 4° to 5°, for example 4.5°. The range of the far field may in this case be for example 8 m to 12 m.

In the case of a particularly preferred embodiment of the floor treatment system according to the invention, the first transmitting unit has at least two transmitting elements, the emitted infrared radiation of which is superposed on one another. The transmission energy of the first transmitting unit is consequently provided by at least two transmitting elements, the far field being obtained by superposing the radiation fields emitted by the two transmitting elements. As a result, the far field can have a high energy density.

The transmitting elements of the first transmitting unit preferably have at least one associated optical element for beam control. It may be provided in this respect that the optical elements associated with the individual transmitting elements are connected to one another in one piece. This considerably facilitates the assembly of the first transmitting unit.

It has proven to be advantageous if the near field has at least two field regions disposed next to each other.

In this respect it is of particular advantage if the individual field regions of the near field are configured in a lobar manner and in each case have an axis of symmetry. It has proven to be advantageous if the lobar field regions are aligned mirror-symmetrically in relation to the axis of symmetry of the far field.

For example, it may be provided that the lobar field regions have an aperture angle of about 10° to approximately 20°, in particular about 15°, with respect to their respective axis of symmetry. The lobar field regions of the near field may be inclined downwardly relative to the horizontal at an angle of about 3° to approximately 8°, preferably 5°.

In the case of a preferred configuration, the axes of symmetry of two field regions of the near field are inclined mirror-symmetrically at an angle of about ±10° to approximately ±20°, in particular at an angle of approximately ±15°, in relation to the axis of symmetry of the far field. In the case of such a configuration, the two field regions of the near field are aligned obliquely in relation to the axis of symmetry of the far field, so that the near field altogether covers a wider area than the far field.

It is advantageous if the second transmitting unit has at least two transmitting elements, the infrared radiation emitted by the transmitting elements being directed in different directions. Consequently, the interaction of at least two transmitting elements emitting infrared radiation in different directions has the effect that the near field is preferably aligned mirror-symmetrically in relation to the axis of symmetry of the far field.

The infrared radiation emitted by the transmitting elements of the second transmitting unit preferably forms in each case a field region of the near field, i.e. every field region of the near field has an associated separate transmitting element of the second transmitting unit.

In the case of a preferred embodiment, the transmitting elements of the first and/or second transmitting unit are configured as infrared-emitting diodes. This permits low-cost production of the transmitting devices.

To simplify the assembly of the transmitting devices, it is advantageous if the infrared-emitting diodes are aligned parallel to one another, the diodes respectively being preceded by an optical element for focusing and/or deflecting the emitted infrared radiation. In this respect, assembly is further simplified by at least some of the optical elements being connected to one another in one piece. For example, it may be provided that the optical elements of the first transmitting unit and of the second transmitting unit are respectively connected to one another in one piece. The optical elements are preferably produced from a plastics material.

In the case of a particularly preferred embodiment, the charging station has a third transmitting unit for the formation of a guiding field of the target radiation for guiding the floor treatment unit during docking onto the charging station. Such a configuration has the advantage that the guidance of the floor treatment unit in the direct vicinity of the charging station can take place by means of the infrared radiation provided by a third transmitting unit. Since the floor treatment unit is in this case only a short distance away from the charging station, only a relatively low transmission energy is required for the third transmitting unit.

The use of a third transmitting unit for guiding the floor treatment unit in the direct vicinity of the charging station also has the advantage that the first and second transmitting units can be disposed in an upper region of the charging station, with respect to the vertical, to achieve a relatively great range, while the third transmitting unit may be disposed directly adjacent to a docking point of the charging station with which the floor treatment unit engages for recharging the power supply unit.

The third transmitting unit preferably comprises a single transmitting element, a visual link existing between the transmitting element and the receiving device during the docking of the floor treatment unit onto the charging station. The positioning of the transmitting element of the third transmitting unit in such a way that a visual link exists during the docking of the floor treatment unit ensures in a constructionally simple way that the floor treatment unit can reliably steer toward the docking point of the charging station.

An infrared-emitting diode may be used as the transmitting element for the third transmitting unit.

In the case of a preferred embodiment, the receiving device of the floor treatment unit has at least two spaced-apart infrared-sensitive sensors. The two sensors are preferably aligned obliquely in relation to each other, in particular at an angle of 120°. It is advantageous if the sensors respectively have an associated optical element for beam control and/or focusing, so that the infrared-sensitive area of the sensors extends in a horizontal direction over an angular range of more than 180°.

It is of particular advantage if the receiving device has four infrared-sensitive sensors, two sensors being directed forward, in the main direction of movement, and two sensors being directed rearward, counter to the main direction of movement. This has the advantage that the sensors are even sensitive to infrared radiation which impinges on the optical elements from an area to the rear with respect to the main direction of movement of the floor treatment unit. The two forwardly directed sensors are preferably disposed in a central region of the mobile floor treatment unit. It is particularly advantageous if the two forwardly directed sensors are aligned obliquely in relation to each other, preferably the two forwardly directed sensors are at an angle of 120° in relation to each other.

In the case of a particularly preferred embodiment, it is provided that the receiving device has two infrared-sensitive sensors which are respectively disposed in the region above a drive wheel of the floor treatment unit, in particular are directed counter to the main direction of movement. It has been found that a great directionally dependent sensitivity to infrared radiation is obtained for the receiving device by disposing the sensors in this way. The two sensors are in this case spaced relatively far apart and are respectively positioned in an outer region of the floor treatment unit. If infrared light is received by one of the sensors, the floor treatment unit can automatically turn and align itself with the target radiation in such a way that two forwardly directed sensors receive the infrared light with the same intensity and the floor treatment unit can follow the target radiation.

As mentioned at the beginning, it is possible in particular for a floor surface to be cleaned by means of the floor treatment unit. For this purpose, it is provided in the case of a particularly preferred embodiment of the floor treatment system according to the invention that the floor treatment unit is formed as a suction device, with a dirt collecting container having a suction inlet and with a suction turbine, and that the central charging station has a suction-extraction assembly and also a dirt receiving container, it being possible for the dirt collecting container to be emptied by the suction-extraction assembly via the suction inlet and at the same time the power supply unit to be recharged by the charging station. By means of a floor treatment system configured in this way, a floor surface can be reliably vacuum-cleaned, a suction flow being produced by the suction turbine during the normal operation of the floor treatment unit, so that dirt can be picked up from the floor surface and transferred via the suction inlet into the dirt collecting container. The drive of the suction turbine takes place in this case by means of an electric motor, which is connected to a rechargeable power supply unit. If the charging state of the power supply unit falls below a predetermined limit value, the floor treatment unit steers toward the central charging station, as explained above, so that the power supply unit can be recharged. At the same time, the dirt collecting container of the floor treatment unit is emptied during the charging process. For this purpose, the central charging station comprises a suction-extraction assembly, which produces a suction-extraction flow during the charging process, so that the dirt located in the dirt collecting container can be extracted via the suction inlet and transferred into the dirt receiving container of the charging station.

In the case of a preferred embodiment, the charging station comprises a suction-extraction opening, which is aligned with the suction inlet of the floor treatment unit during the docking of the floor treatment unit. It may be provided that the charging station comprises a ramp at which the suction-extraction opening is disposed, the floor treatment unit running onto the ramp during the docking onto the central charging station, so that the suction inlet positioned at a bottom wall of the floor treatment unit can be positioned in line with the suction-extraction opening.

The following description of a preferred embodiment of the invention serves for a more detailed explanation in conjunction with the drawings.

DETAILED DESCRIPTION OF THE INVENTION

Figure 1:
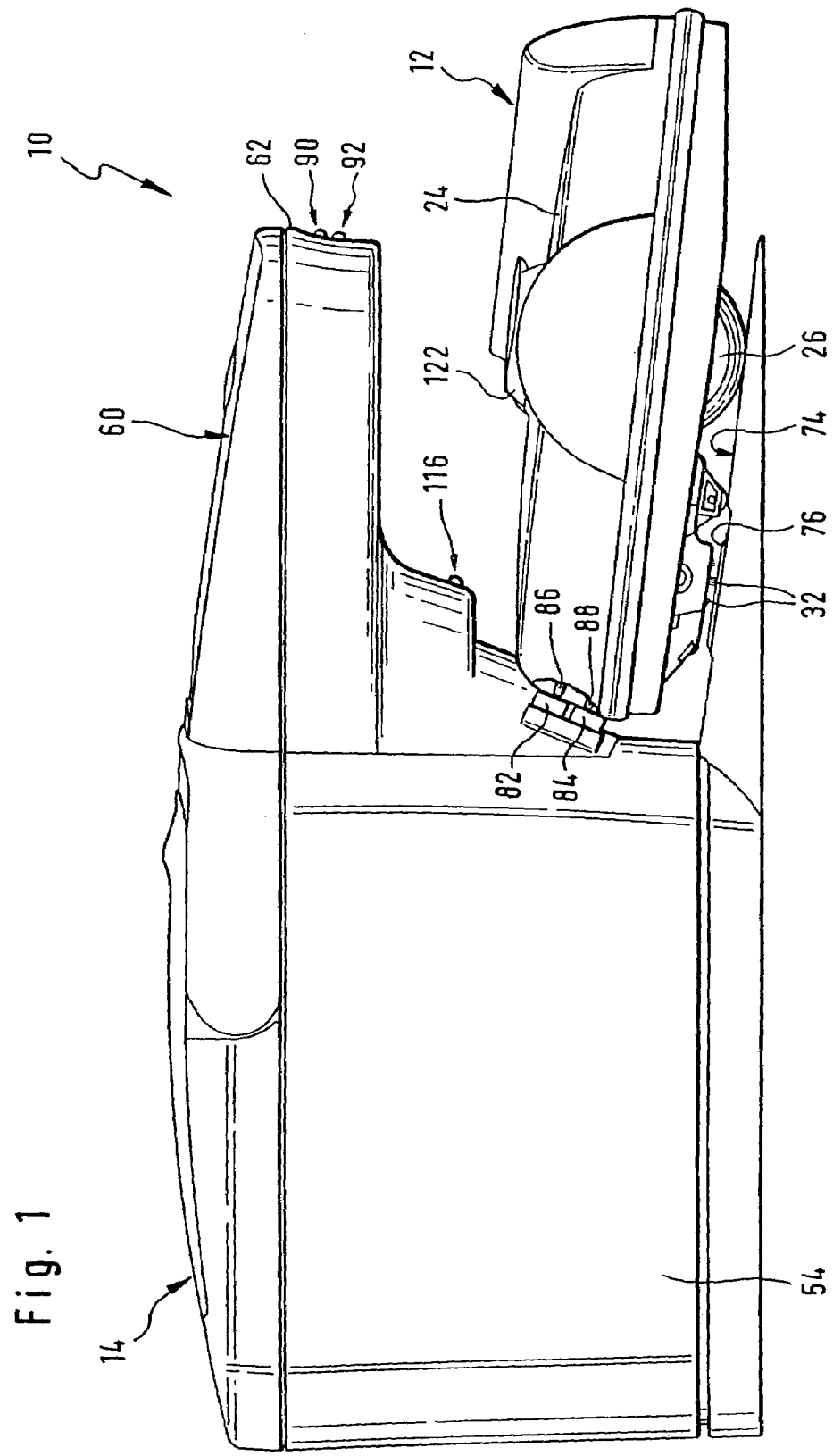
FIG. 1 shows a schematic side view of a floor treatment system according to the invention during the docking of the floor treatment unit onto a central charging station.
Figure 2:
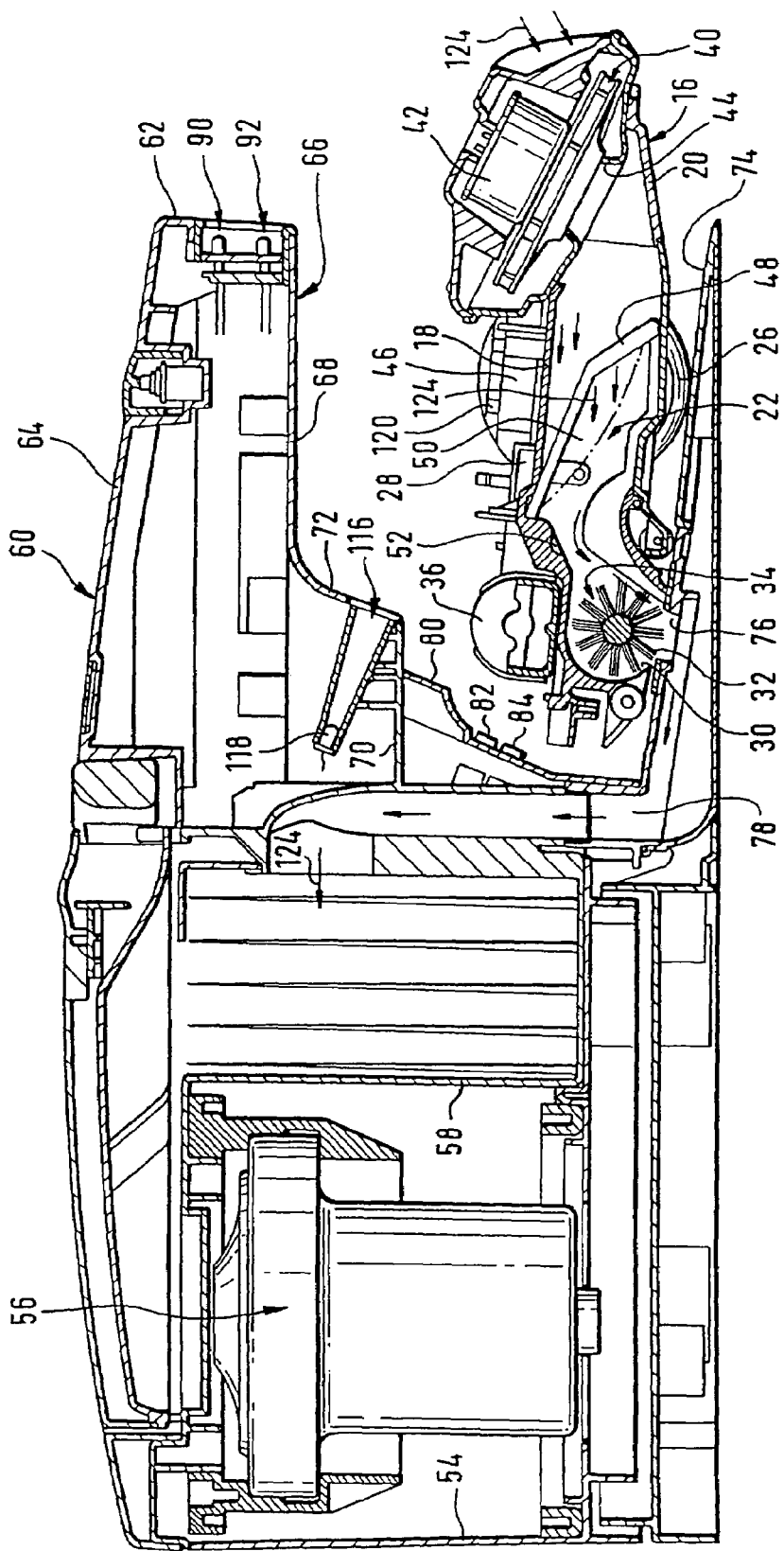
FIG. 2 shows a schematic longitudinal sectional view of the floor treatment system according to FIG. 1.

Schematically represented in FIGS. 1 and 2 is a floor treatment system according to the invention, in the form of the floor cleaning system designated as a whole by the reference numeral 10. The floor cleaning system 10 comprises a mobile floor treatment unit in the form of a self-propelled and self-steering suction device 12 and also a central charging station 14.

The suction device 12 has a housing 16 with a top wall 18 and a bottom wall 20, which between them define a suction channel 22. Fitted on the top wall 18 is a cover 24, which is not represented in FIG. 2 to achieve better overall clarity.

The housing 16 forms a chassis, on which two drive wheels 26, associated with each of which there is a drive motor known per se (not represented), are rotatably mounted in a way which is known per se and is therefore only shown schematically in the drawing. The control of the drive motors takes place by means of an electronic control system 28, which is known per se, is represented in FIG. 2 in the manner of a block diagram and is connected to the drive motors via control lines which are not represented in the drawing.

The bottom wall 20 has in a front region, facing the charging station 14, a suction inlet 30, reaching through which are sweeping brushes 32 of a brush roller 34 rotatably mounted above the suction inlet 30. The brush roller 34 can be driven in a rotating manner by means of an electric motor 36, which is located above the brush roller 34 on the top wall 18 and is coupled to the brush roller 34 via transmission means which are known per se and therefore not represented in the drawing.

In its rear region, facing away from the charging station 14, the housing 16 carries a suction turbine 40, which can be driven in a rotating manner by an electrical drive motor 42 and is in flow connection with the suction channel 22 via an intake connector 44.

The power is supplied to the electrical loads of the suction device 12 by means of a rechargeable power supply unit in the form of a rechargeable battery 46, which is carried by the top wall 18 and schematically represented in FIG. 2.

Disposed inside the suction channel 22 is a dirt filter 48, and the region of the suction channel 22 between the dirt filter 48 and the suction inlet 30 forms a dirt collecting container 50, the filling level of which is monitored by a filling level sensor 52, which is in electrical connection with the control system 28.

For cleaning the floor surface, a suction flow is generated by the suction turbine 40, with the help of which dirt can be transferred from the floor surface through the suction inlet 30 into the dirt collecting container 50. The picking up of dirt from the floor surface is assisted by the brush roller 34. The suction device 12 in this case automatically travels across the floor surface to be treated in accordance with a predetermined control program, until the charging state of the battery 46, monitored by the control system 28, falls below a predetermined lower limit value or it is detected by the filling level sensor 52 that the dirt collecting container 50 is full. If at least one of these conditions is satisfied, the suction device 12 automatically steers toward the charging station 14, at which the battery 46 can be charged and the dirt collecting container 50 emptied.

The charging station 14 has a housing 54, which surrounds a suction-extraction assembly 56 and a dirt receiving container 58, which can be subjected to negative pressure by the suction-extraction assembly 56.

Mounted on the side of the housing 54 of the charging station 14 is an extension arm 60, which at its end facing away from the housing 54 has an end wall 62, which is connected to the housing 54 by means of a covering 64 and a carrier plate 66. The carrier plate 66 is formed in a stepped manner here and comprises a front carrying plate portion 68, facing the end wall 62, and a rear carrier plate portion 70, facing the housing 54, which are connected to one another in one piece by means of an obliquely running step 72.

Formed onto the housing 54 underneath the carrier plate 66 and at a distance from it in the vertical direction is a ramp 74, which has a suction-extraction opening 76. The latter is connected to the dirt receiving container 58 via a suction-extraction channel 78.

Disposed between the end of the ramp 74 facing the housing 54 and the rear carrier plate portion 70 is a supporting wall 80, which carries two electrical contact elements 82, 84. The charging station 14 comprises a charger, which is known per se and therefore not represented in the drawing, can be connected to a supply voltage and is connected to the electrical contact elements 82 and 84 by means of leads not represented in the drawing.

Associated with the electrical contact elements 82 and 84 of the charging station 14 are two electrical contact pins 86, 88, which are schematically represented in FIG. 1, are mounted on the outer side of the cover 24 of the suction device 12 and are in connection with the rechargeable battery 48 by means of connecting lines not represented in the drawing. Electrical energy from the charging station 14 can be transferred to the suction device 12 via the electrical contact elements 82, 84 and the associated electrical contact pins 86 and 88, respectively, for charging the battery 46.

Figure 3:
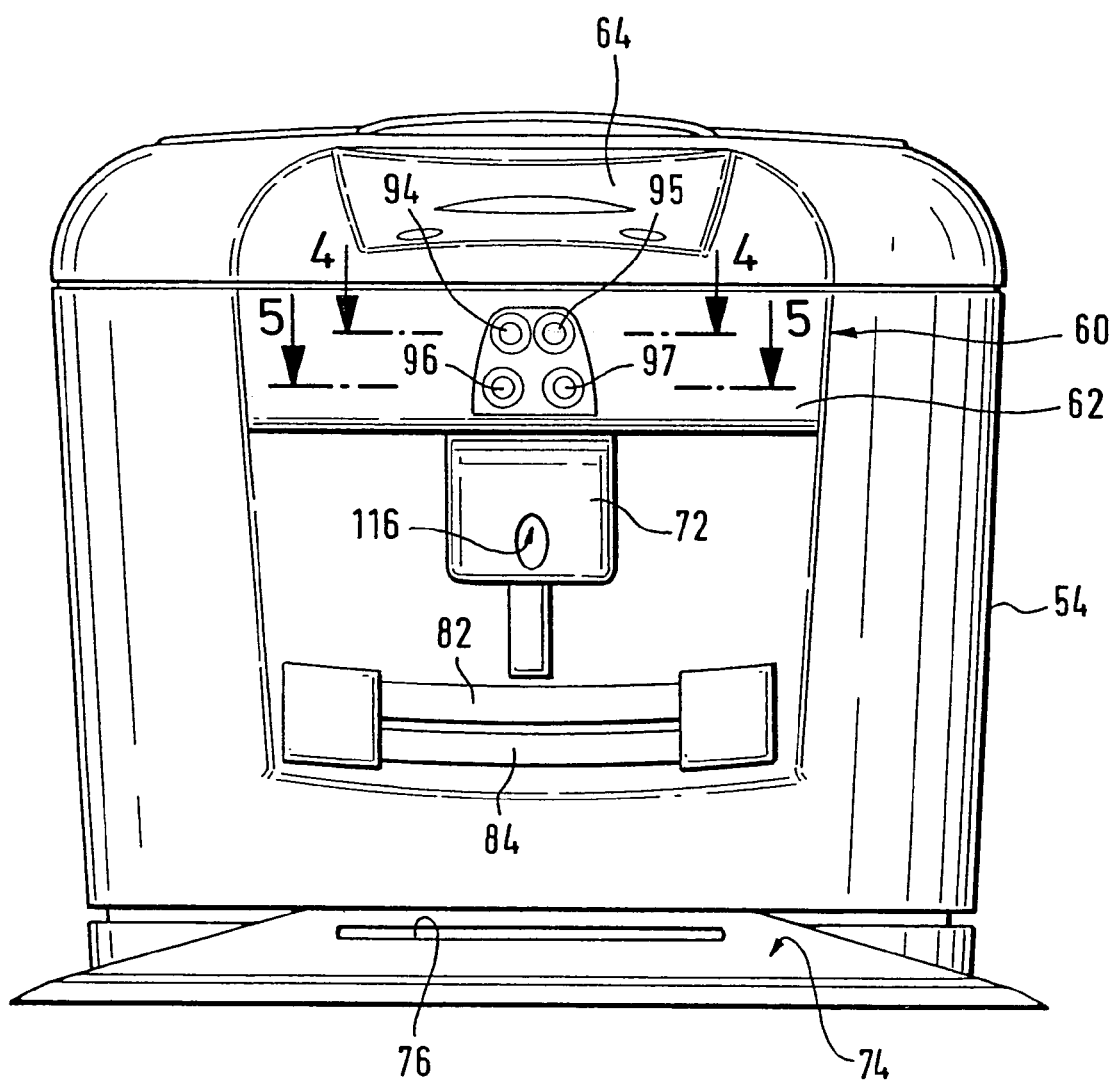
FIG. 3 shows a front view of the central charging station of the floor treatment system.
Figure 4:
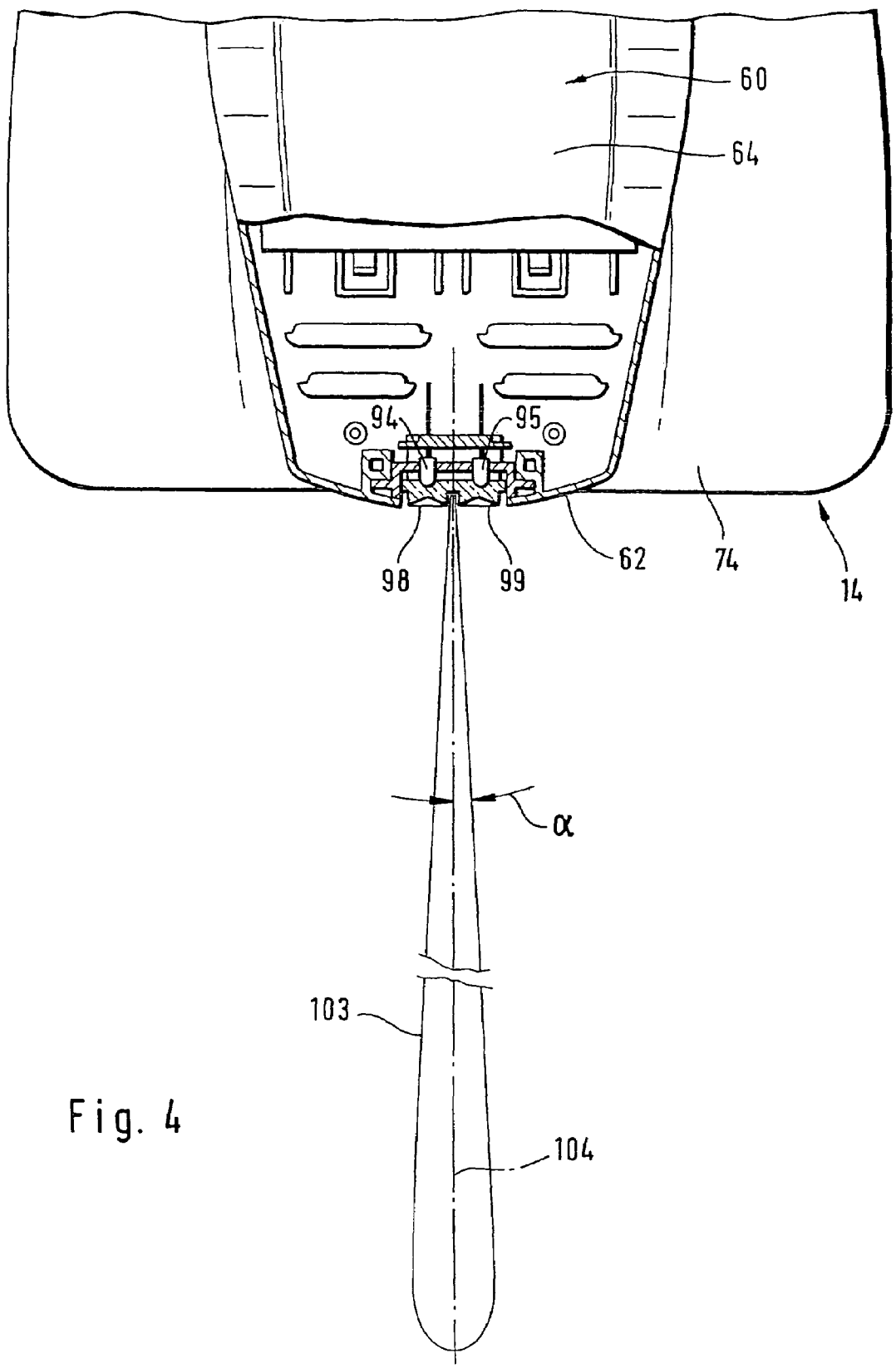
FIG. 4 shows a partial sectional view along the line 4—4 in FIG. 3.
Figure 5:
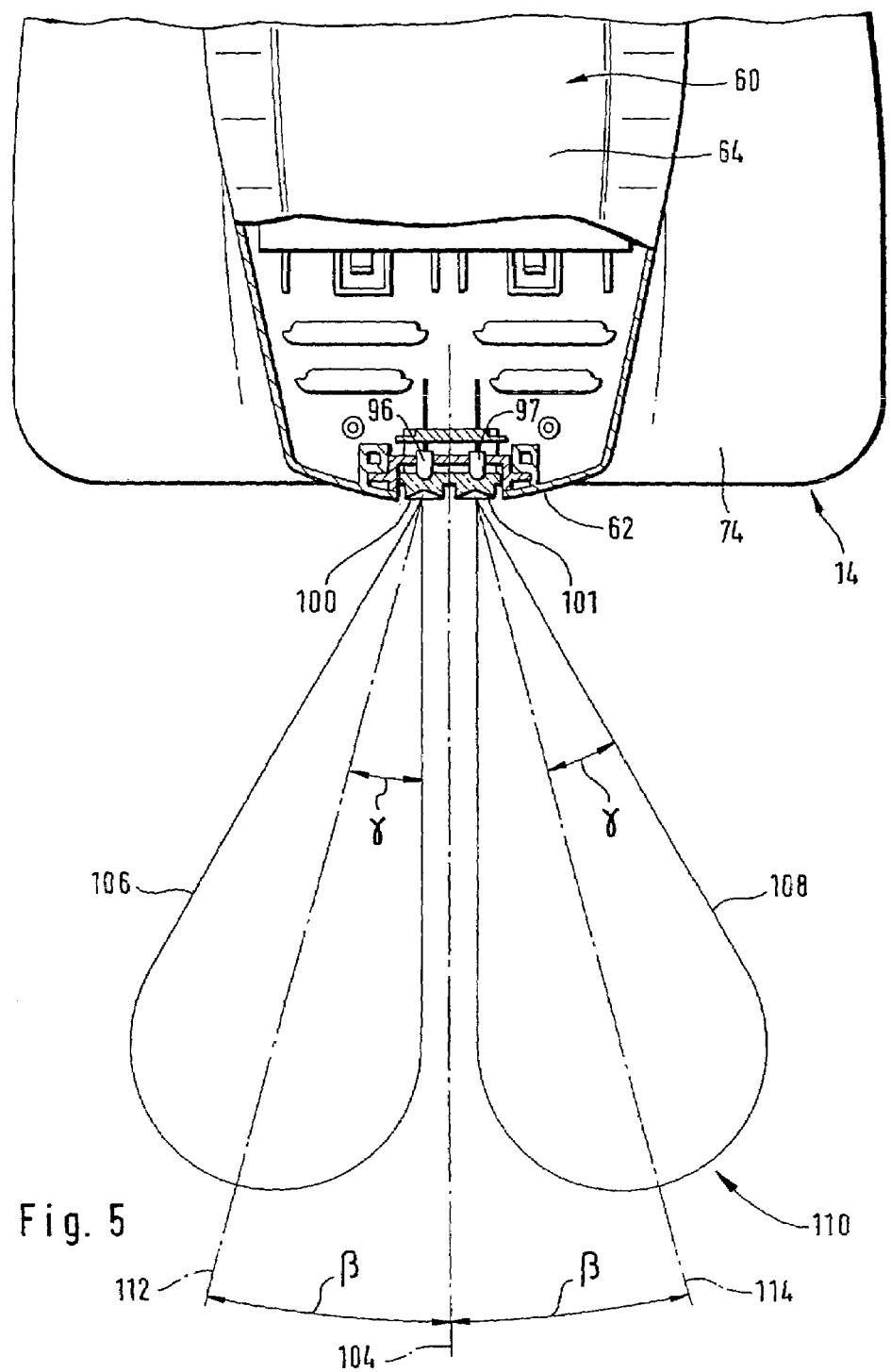
FIG. 5 shows a partial sectional view along the line 5—5 in FIG. 3.

Mounted on the end wall 62 of the charging station 14, one above the other in the vertical direction, are a first transmitting unit 90 and a second transmitting unit 92, which in each case comprise two infrared-emitting diodes 94, 95 and 96, 97, respectively, which becomes clear in particular from FIGS. 3, 4 and 5. The diodes 94, 95, 96, 97 are in each case preceded by an optical deflecting and focusing element 98, 99, 100 and 101, respectively, the two optical elements 98, 99 of the first transmitting unit 90 and similarly the two optical elements 100 and 101 of the second transmitting unit 92 being respectively connected to one another in one piece. Infrared radiation is respectively emitted by the first transmitting unit 90 and the second transmitting unit 92. The infrared radiation emitted by the first transmitting unit 90 in this case forms a far field 103, which is schematically represented in FIG. 4, is formed in a lobar manner and has an axis of symmetry 104. The far field 103 has a range of approximately 8 to 12 m and is formed by superposing the infrared radiation emitted by the two infrared-emitting diodes 94, 95 of the first transmitting unit 90. The far field 103 is concentrated on a relatively narrow spatial region; the aperture angle α of the lobar far field 103 with respect to the axis of symmetry 104 is 4.5°. The axis of symmetry 104 is directed obliquely downward in relation to the horizontal at an angle of approximately 1°.

The infrared radiation emitted by the two diodes 96 and 97 of the second transmitting unit 92 in each case forms a lobar field region 106 and 108, respectively, which are represented in FIG. 5 and altogether define a near field 110 of the infrared radiation emitted by the second transmitting unit 92.

The two lobar field regions 106 and 108 have in each case an axis of symmetry 112 and 114, respectively, which are aligned mirror-symmetrically in relation to each other with respect to the axis of symmetry 104 of the far field 103, represented by dashed lines in FIG. 5, respectively forming an angle of inclination β of 15° with the axis of symmetry 104. The aperture angle γ of the lobar field regions 106 and 108 with respect to the respective axis of symmetry 112 and 114 is in each case likewise 15°. The range of the near field 110 is about 1.5 to 4.5 m; the axes of symmetry 112 and 114 of the field regions 106 and 108 are respectively directed obliquely downward at an angle of about 5° in relation to the horizontal.

In addition to the first transmitting unit 90 and the second transmitting unit 92, the charging station 14 comprises a third transmitting unit 116, which is held on the step 72 and has a single infrared-emitting diode 118, this diode 118 not having an associated optical deflecting or focusing element. The infrared radiation emitted by the infrared-emitting diode 118 is directed into the region between the extension arm 60 and the ramp 74.

To receive the infrared target radiation emitted by the first, second and third transmitting units 90, 92, 116, the suction device 12 comprises two forwardly directed infrared-sensitive sensors 120, which are coupled to the control system 28 of the suction device 12. In order that the infrared target radiation emitted by the transmitting units 90, 92 and 116 can impinge on the infrared-sensitive sensors 120 virtually unhindered, the cover 24 of the suction device 12 comprises for each sensor 120 an associated window 122 that is transparent to infrared light. In addition, two sensors which are respectively positioned above a drive wheel and are directed rearward, but are not represented in the drawing, are used.

If, when traveling across the floor surface to be cleaned, the control system 28 of the suction device 12 detects that the charging state of the battery 46 falls below a lower limit value or that the dirt collecting container 15 is full, the suction device 12 aligns itself in accordance with the target radiation emitted by the transmitting units 90, 92, 116 and automatically steers toward the charging station 14. In the region of the charging station 14, the suction device 12 is reliably guided to the ramp 74 by means of the infrared radiation provided by the third transmitting unit 116, which forms an infrared guiding field in the region of the ramp 74, so that the suction device 12 runs onto the ramp 74 until the electrical contact pins 86 and 88 of the suction device 12 come into mechanical and electrical contact with the electrical contact elements 82 and 84 of the charging station 14, so that the charging current can flow to the battery 46. The suction device 12 hereby assumes such a position on the ramp 74 that the suction-extraction opening 76 is aligned with the suction inlet 30. As soon as a charging current flows via the electrical contact elements 82 and 84, the suction-extraction assembly 56 is put into operation, so that a suction-extraction flow forms through the suction channel 22 of the suction device 12 and the suction-extraction channel 78, which is schematically illustrated in FIG. 2 by the arrows 124, and consequently the dirt collecting container 50 is emptied at the same time as the recharging of the battery 46.

The invention claimed is:

1. Floor treatment system with a self-propelled and self-steering floor treatment unit, which comprises an electrically driven floor treatment assembly and also a rechargeable power supply unit and an electrical control system, and with a central charging station for recharging the power supply unit, the charging station having a transmitting device for emitting an infrared target radiation, and it being possible for the target radiation to be sensed in a directionally dependent manner by a receiving device of the floor treatment unit for the automatic alignment and positioning of the floor treatment unit at the charging station, wherein the transmitting device has a first transmitting unit for the formation of a far field of the target radiation and a second transmitting unit for the formation of a near field of the target radiation, the near field extending over a wider and shorter area from the charging station than the far field.

2. Floor treatment system according to claim 1, wherein the far field is configured in a lobar manner.

3. Floor treatment system according to claim 1, wherein the first transmitting unit has at least two transmitting elements, the emitted infrared radiation of which is superposed on one another.

4. Floor treatment system according to claim 3, wherein the transmitting elements of the first transmitting unit have an associated optical element for beam guidance.

5. Floor treatment system according to claim 1, wherein the near field has at least two field regions disposed beside one another.

6. Floor treatment system according to claim 5, wherein the field regions are configured in a lobar manner and in each case have an axis of symmetry.

7. Floor treatment system according to claim 5, wherein the field regions are aligned mirror-symmetrically in relation to an axis of symmetry of the far field.

8. Floor treatment system according to claim 6, wherein the axes of symmetry of two field regions are each inclined at an angle β of approximately 10° to approximately 20° to the axis of symmetry of the far field.

9. Floor treatment system according to claim 1, wherein the second transmitting unit has at least two transmitting elements, the infrared radiations emitted by the transmitting elements being aligned in different directions.

10. Floor treatment system according to claim 9, wherein the infrared radiations emitted by the transmitting elements of the second transmitting unit form in each case a field region of the near field.

11. Floor treatment system according to claim 1, wherein the transmitting elements of the first and/or second transmitting unit are configured as infrared-emitting diodes.

12. Floor treatment system according to claim 11, wherein the infrared-emitting diodes respectively associated with a transmitting unit are aligned parallel to one another and the diodes are in each case preceded by an optical element for focusing and/or deflecting the emitted infrared radiation.

13. Floor treatment system according to claim 1, wherein the charging station has a third transmitting unit for the formation of a guiding field of the target radiation for guiding the floor treatment unit during docking onto the charging station.

14. Floor treatment system according to claim 13, wherein the third transmitting unit has a single transmitting element, a visual link existing between the transmitting element and the receiving device during the docking of the floor treatment unit onto the charging station.

15. Floor treatment system according to claim 14, wherein the transmitting element of the third transmitting unit is formed as an infrared-emitting diode.

16. Floor treatment system according to claim 1, wherein the receiving device has at least two infrared-sensitive sensors, which are disposed in a central region of the floor treatment unit.

17. Floor treatment system according to claim 1, wherein the floor treatment unit forms a suction device with a dirt collecting container having a suction inlet and with a suction turbine, and the central charging station has a suction-extraction assembly and also a dirt receiving container, it being possible for the dirt collecting container to be emptied by the suction-extraction assembly via the suction inlet and at the same time the power supply unit to be recharged by the charging station.

* * * * *